May 2, 1933.  C. SMITH  1,906,646
AUTOMATIC STOCK QUOTATION ANNOUNCING SYSTEM
Filed Feb. 20, 1930   7 Sheets-Sheet 1
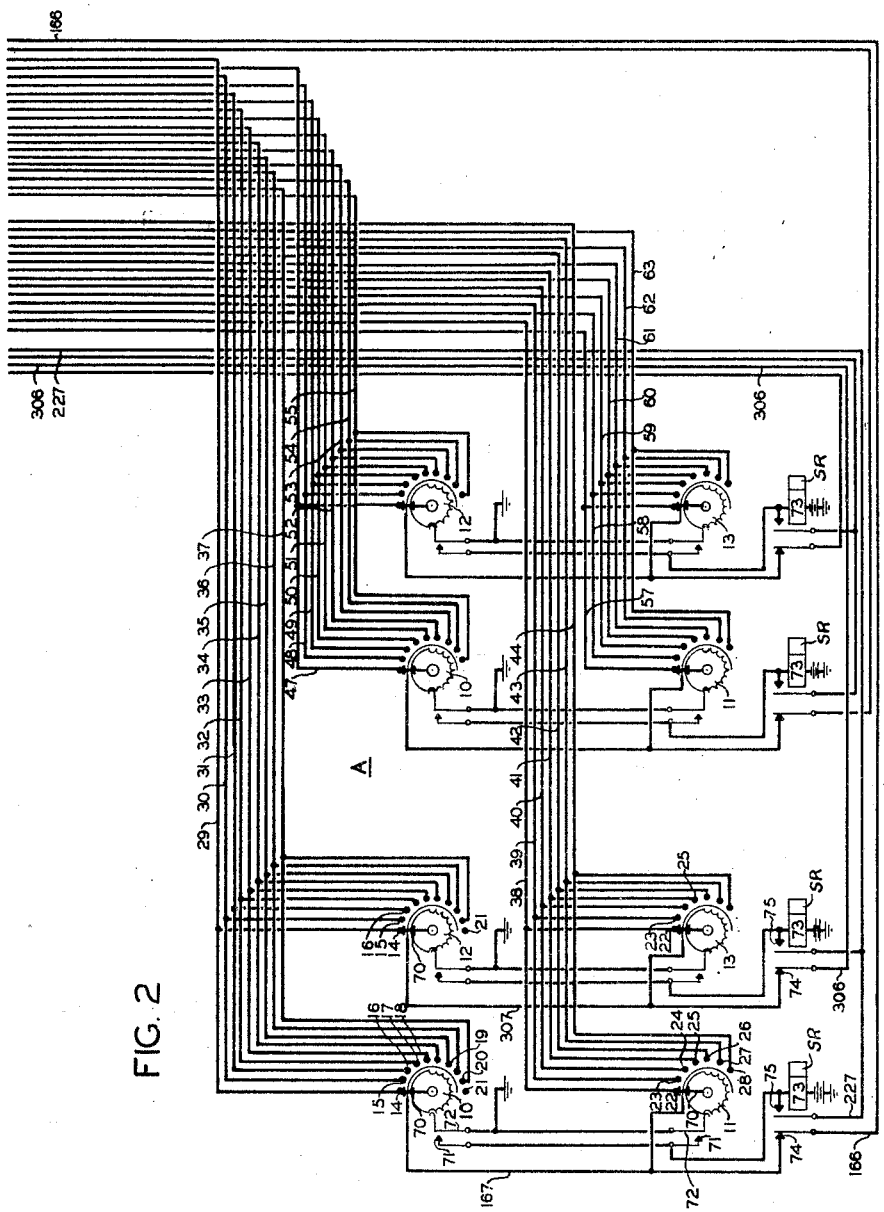
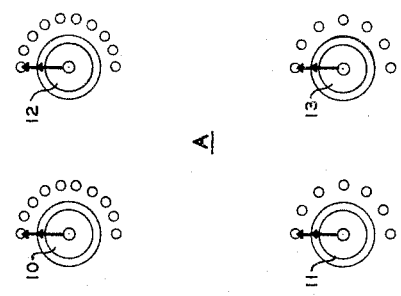
INVENTOR
CLYDE SMITH
BY
F. Hutchinson
ATTORNEY May 2, 1933.　　　　C. SMITH　　　　1,906,646
AUTOMATIC STOCK QUOTATION ANNOUNCING SYSTEM
Filed Feb. 20, 1930　　7 Sheets-Sheet 2

INVENTOR
CLYDE SMITH
BY
*F. Hutchinson*
ATTORNEY

May 2, 1933.     C. SMITH     1,906,646
AUTOMATIC STOCK QUOTATION ANNOUNCING SYSTEM
Filed Feb. 20, 1930     7 Sheets-Sheet 4

FIG. 5.

INVENTOR
CLYDE SMITH
BY
*F. Hutchinson*
ATTORNEY

May 2, 1933.   C. SMITH   1,906,646
AUTOMATIC STOCK QUOTATION ANNOUNCING SYSTEM
Filed Feb. 20, 1930   7 Sheets-Sheet 6

INVENTOR
CLYDE SMITH
BY
F. Hutchinson
ATTORNEY

May 2, 1933.  C. SMITH  1,906,646
AUTOMATIC STOCK QUOTATION ANNOUNCING SYSTEM
Filed Feb. 20, 1930  7 Sheets-Sheet 7

INVENTOR
CLYDE SMITH
BY
ATTORNEY

Patented May 2, 1933

1,906,646

UNITED STATES PATENT OFFICE

CLYDE SMITH, OF HOPKINSVILLE, KENTUCKY, ASSIGNOR TO INTERNATIONAL COMMUNICATIONS LABORATORIES, INCORPORATED, OF NEW YORK, N. Y., A CORPORATION OF NEW YORK

AUTOMATIC STOCK QUOTATION ANNOUNCING SYSTEM

Application filed February 20, 1930. Serial No. 429,982.

The invention relates to an automatic talking quotation system permitting stock brokers to obtain directly by voice reproductions, prevailing prices of stocks and commodities from a source of price at the various stock and curb exchanges.

In accordance with the invention, each stock or commodity is assigned a number as in a telephone directory and each broker's office includes an automatic telephone, less transmitter induction coil and ringer. To obtain the price of, say, stock X, the broker refers to the stock directory and notes the dial number for this stock, which in this instance will be arbitrarily assumed as 12. The broker dials this number and immediately the word "bid" is heard, followed by the announcement of the bid price. Following this operation the word "ask" is heard, which is followed by the audible reproduction of the asked price. These steps in a bid and ask cycle of operations constitute an operating period, and a period of operations repeats itself automatically so long as the receiver of an automatic telephone where the stock designation was dialed, is off the hook of the telephone.

Thus, an object of the invention is to provide a novel service to furnish on a no delay basis prevailing prices set up at an exchange or source of prices for stocks or commodities, severally selected from various brokerage offices where the price corresponding to the stock selected is audibly announced.

Another object of the invention resides in the provising of an announcing apparatus having settable means at the source of prices, and several trading posts including selecting mechanism for translating a price setting at a trading post into an audible price record to be heard at a stock selecting station or telephones at a brokerage office or the like.

Another object of the invention includes means for preventing the intermingling of numbers of successive sets of prices if a price change is made for a subsequent price during the process of transmission of a previous price.

Specifically, another object of the invention is in the provision of means for permitting more than one calling party to hear at the same time prevailing prices of the same stock.

Briefly stated, the invention comprises stock price dials or indicators, automatic telephones and associated dials, line finding switches, digit switches which respond to pulses from the dials of the several telephones, digit finding switches responsive to the operation of the digit switches, and a unit of selecting mechanism comprising a group of sound band control relays including a set for each integer in the price, and a group of price sound bands comprising a sound band for each integer in the price and a sound band for each fraction in the price, a common driving means actuating time controlled cam members for selectively operating several bands of a group of price sound bands and several control relays for bid and ask sound bands included in the group price sound bands for the integer in the price.

More particularly, the object of the invention is to provide a system for selecting a stock number which is dialed on an automatic telephone whereby the last bid and asked quotation of the stock selected corresponding to the number dialed is transmitted from a price source to the telephone where the stock number was previously dialed.

In attaining another object of the invention, it is proposed to utilize a selectively controlled transmitting unit to serve many calling lines and various stocks. Each unit may include four groups of price sound bands for three integers and a fraction of the price, or three groups for two integers and a fraction of the price, or two groups for one integer and a fraction of the price, either for the bid or asked quotations, but it should be understood that where more than two groups of price sound bands are employed, only one selected group need be operated, if the price change is in the fractions only.

Broadly speaking, the invention includes means settable at will at the price source, line finding means responsive to dial impulses, and means for audibly transmitting the position of said settable means.

Still another object of the invention resides in the provision of a time sound control cam and starting cam, each common to a price sound band unit whereby the start cam commences a period of operation in the announcement of "bid" and returns to zero or neutral setting following the asked price quotation, while the time sound control cam causes selected relays to be set up for the bid and asked quotations which are transmitted for audible reproduction.

The system is designed for furnishing service on a no delay basis but where the unit selected is busy, that is, in the midst of operating, a delay will occur but only for the operating time required to complete a previous quotation announcement.

Where a calling line has access to sound bands at any stage of their operation, fragmentary price changes would be heard. Provision has been made to prevent fragmentary reports by disconnecting the calling line until stock selecting switches have reached their selected position, and this is accomplished by disabling a cut off relay at the beginning of the dialing period until the wipers of several dial switches have reached their selected position and the sound bands have reached their starting position, if they be off the start position at the time of a call.

In the talking quotation system herein disclosed, time controlled means have been provided for driving sound band shafts during the period of transmission. This period may vary. For the bid price of a stock may be in one integer or fraction or in both, and the asked price may be in an integer or fraction or in both. Additionally, various stocks are differently priced. One may be in one integer and a fraction and another stock in three integers and a fraction. With this system, the circuits and mechanism are so arranged that the operating time for a price with one integer and a fraction is two-thirds the operating time of a price having two integers and a fraction.

Accordingly, a further object of the invention resides in the control of the sound band cam and the starting cam wherein the former is divided into three equal parts, one to control the bid sound band, one to control the sound band for the integer of the price, and one to control the fraction band whereby the circuits controlled by the sound band cam through the operation of an associated make before break switch and bid control relays are so arranged that no matter where the sound control cam may stop on an operation at the completion of an operating period, the first step on the next cycle of operations will cause the bid sound band to become operative, if a setting has been made for a new bid price or even if no new bid setting has been made at or before the completion of a period of operations, the first operating step on the next period would be the announcement of the word bid.

A still further object of my invention includes means associated with the time controlled start cam to prevent the calling line from hearing fragmentary reports at the time when a sound unit is serving other calling lines and to preclude double registration of a price, if a price dial is adjusted during the transmission period together with means for automatically adjusting said cam to various combinations of operations and for restoring the cam to its zero position at the end of each period of operation.

According to the invention, one group of sound band price control relays, one group of sound bands, and one group of control relays to announce the bid and ask cycles of operations, common to all stocks are employed for both the bid and ask operations, the control relays for the announcement of an ask cycle being held ineffective until the bid operation is complete. Also, the bid prices may be in one integer and the asked in one integer and a fraction. It may be that a bid price only is desired to be transmitted, or that an asked price only is desired to be transmitted. Thus, another aspect of the invention includes suitable means for withholding the ask operation until the bid operation terminates which must immediately follow the bid operation without any dead time, namely, a silent interval representing the absence of the fraction in the bid price, or a silent interval, if there be no bid price, or a silent interval if there be no asked price, completing the period of operation at the announcement of the bid price irrespective of the number of digits and a fraction it may include.

Features of the invention relate to a plurality of line finding switches for picking up a calling line on the removal of a receiver from an automatic telephone, a plurality of digit switches for selecting a particular stock, a plurality of digit switch finders which serve as a connecting link between the digit switches and a plurality of price changing dials operatively connected to the apparatus located at an exchange or source of price, and common circuit means for connecting the line finding switches with the digit switches and common circuit means connecting the digit finding switches with the price dials, and circuit means for advancing the several switch mechanisms to their selected points, means for preparing a starting circuit at the beginning of each period of operation, means for disabling said starting circuit and establishing an ask common relay circuit at the completion of the bid price announcement, if there be a bid price, and ask for disabling said circuit upon the completion of the ask cycle of operations.

The invention accordingly comprises an audible automatic quotation system having features of construction, combinations of elements, and arrangements of parts which will be exemplified in the construction and method of operation hereinafter set forth and the scope of the application of which will be indicated in the appended claims.

As shown in the drawings there are five so called automatic telephones, two line finders, two digit switches, two digit finding switches, dials for two stocks, two sound band units and their control relays. With the apparatus herein described, as many as five calling parties may obtain at the same time quotations on the same stock on one of the units of sound bands, or several of the calling parties may obtain prices on one stock on one unit of sound bands and the remaining parties may obtain prices on another stock on the other unit of sound bands.

In the accompanying drawings there is shown, for purposes of illustration only, the preferred arrangement of the present invention, disclosing a layout of a system for transmitting bid and ask quotations as set at a price source as a brokerage office or offices, it being understood that the drawings show by way of example only one of the many embodiments of the invention wherein, Fig. 1 shows one stock group of price indicating dials which are price changed by an operator at the source of price to the last prevailing quotation.

Fig. 2 is a portion of the system showing the stock group of price indicating dials illustrated in Fig. 1 and additionally, control circuits together with control relays associated with each bid and ask set of dials of said group, and a group of price indicating dials and associated control circuits and relays for another stock.

Figs. 5 and 6 are fragmentary parts of the system illustrating in pairs sound band control relays, there being a pair for each contact on the bid and ask price dials of a group.

Figure 7:
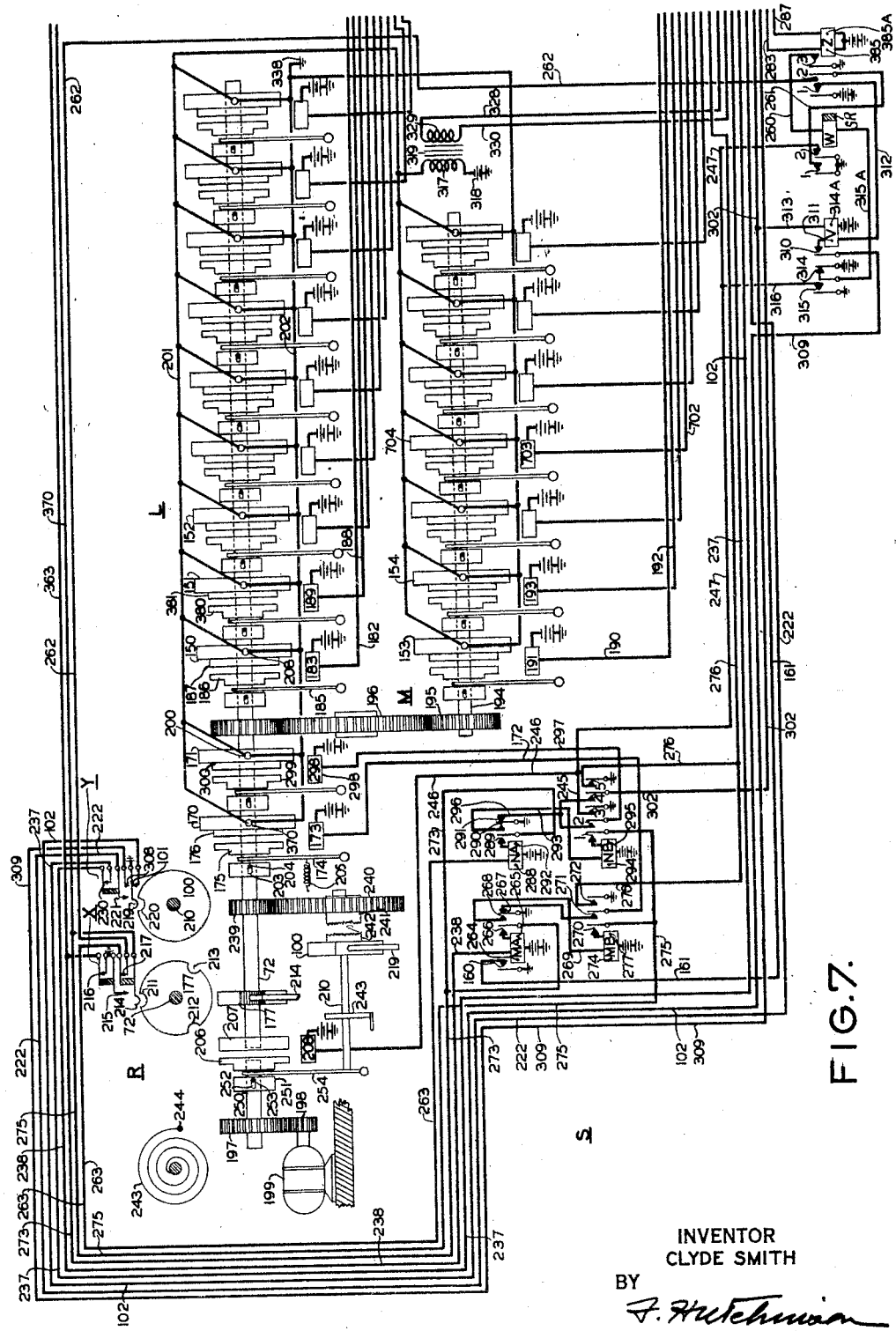
Figure 8:
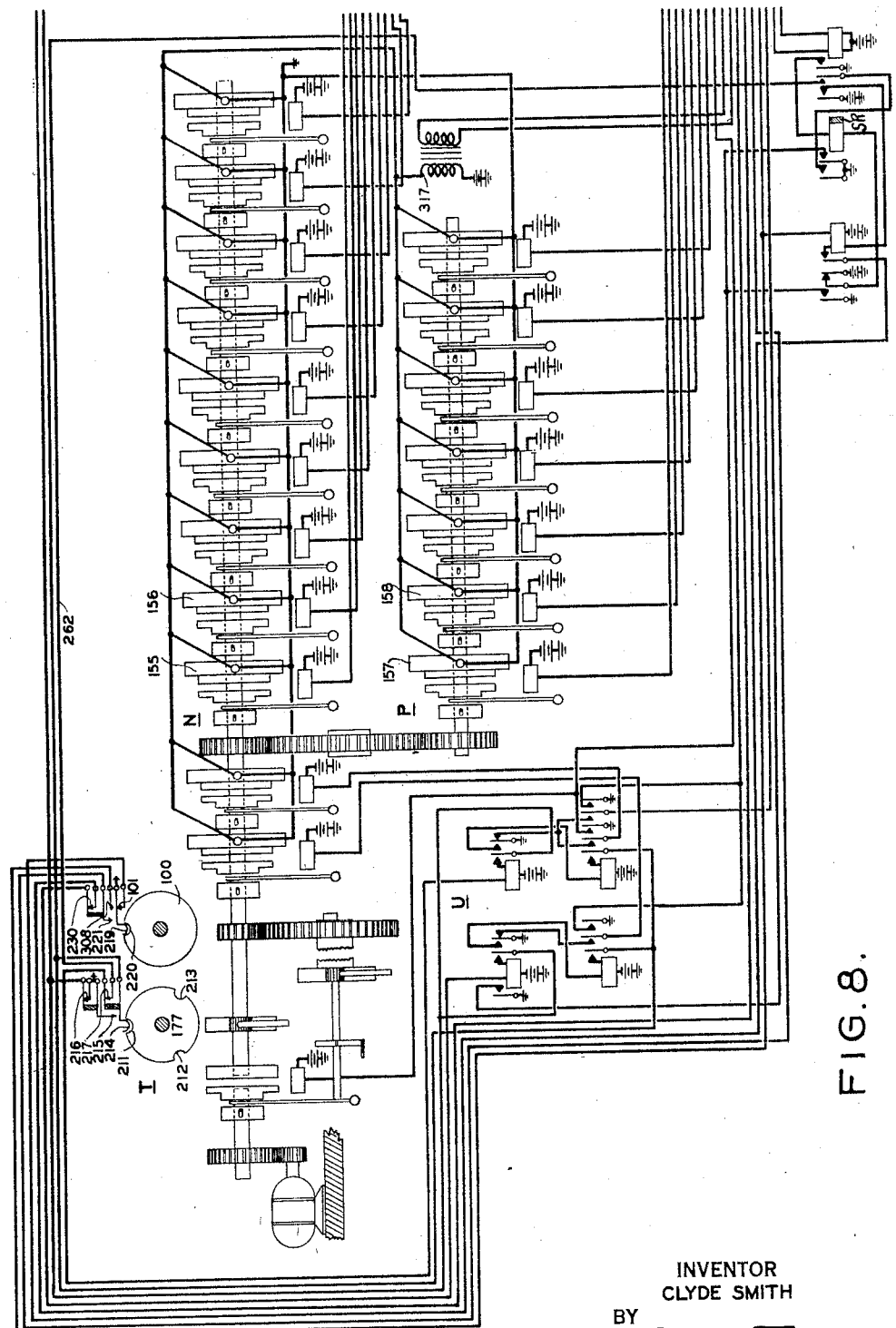

Figs. 7 and 8 each show another part of the system including a sound band unit and the driving mechanism therefor.

Fig. 9 shows an arrangement of the various figures of the drawings in proper order to illustrate the entire system.

In accordance with the invention, it is proposed to locate the apparatus at a central point, preferably where sales are conducted as at the New York Stock Exchange or the like. As disclosed, the apparatus is for one integer and a fraction, and the several mechanisms are positioned in one location. However, it is apparent from the teachings of the disclosure in the specification and drawings that the apparatus may be extended to announce prices in several integers and a fraction, or on a decimal basis, as cotton prices. Moreover, the line finders and digit switches may be located at several different points with second selectors cut between the line finding switches and digit switches, as well understood in the telephone art, so that the range of selection may be widened to include service of several exchanges from one telephone.

Figure 6:
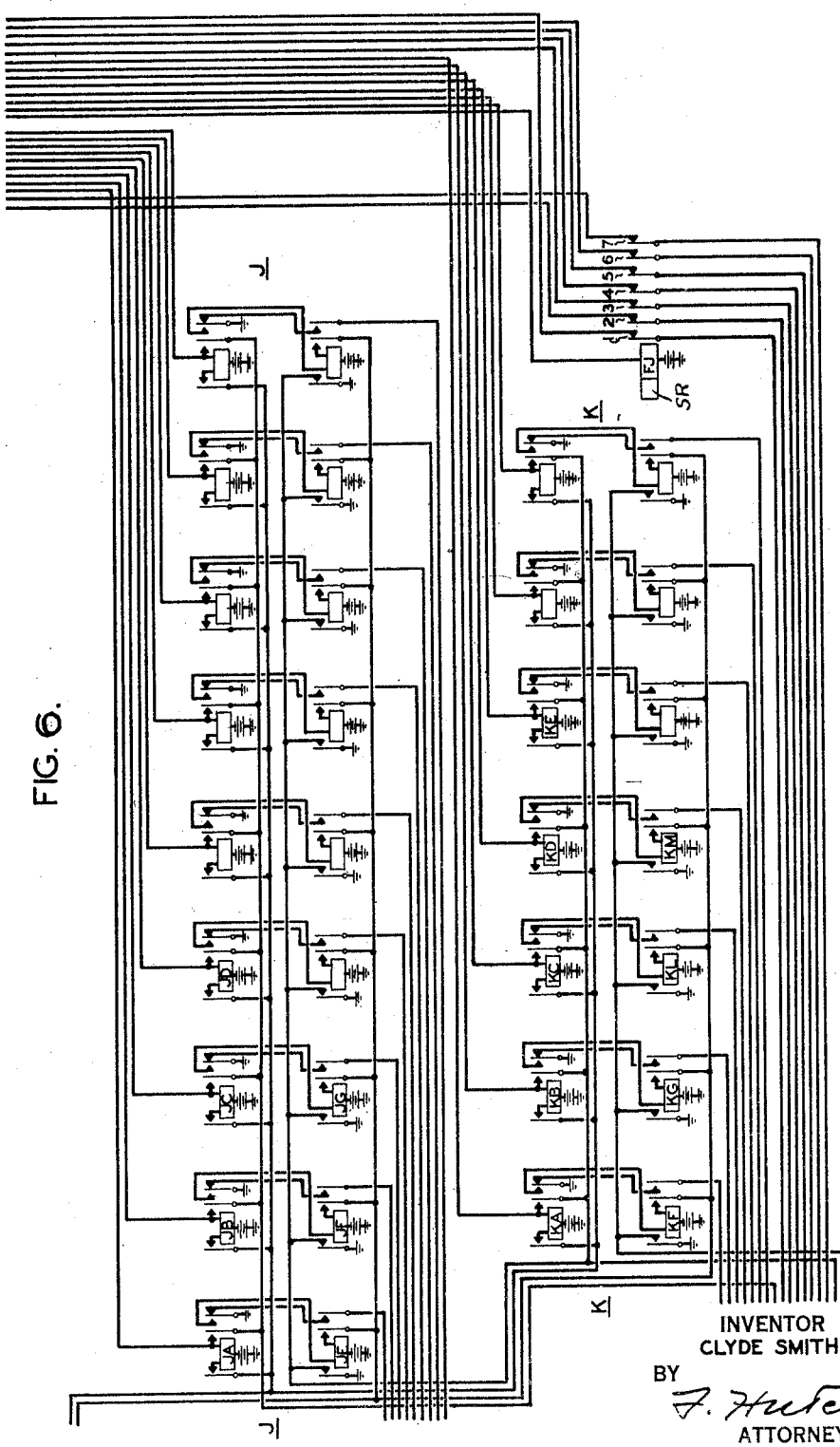

The system as illustrated comprises stock bid and ask price dials, as 10, 11, 12 and 13 generally denoted A in Figs. 1 and 2, a plurality of telephones and associated dials at several brokerage offices extending from B—B (Fig. 3); two three bank line finding switches extending from C—C (Fig. 3) for finding the calling line, two four bank digit switches from D—D (Fig. 3) which respond to pulses from dials of the telephones to select a particular stock; digit switch finders E and F (Fig. 4) which find a digit switch in the same manner that the line finder finds a calling line, the digit finding switches being common to all the digit switches and all stocks; a group of sound band control relays from G—G (Fig. 5) in pairs for the integers in the price, one pair being for each contact on the bid and ask dials; a group of sound band control relays from H—H (Fig. 5) in pairs for the fraction in the price; and another group of sound band control relays comprising sets of pairs and control relays from J—J (Fig. 6) for the integer in the price, and a group from K—K (Fig. 6) in pairs for the fraction in the price; a group of sound bands broadly denoted L (Fig. 7) for the integers in the price; a group of sound bands M (Fig. 7) for the fraction in the price; and another group of sound bands comprising set N (Fig. 8) for the integer in the price of a set P (Fig. 8) for the fraction in the price.

The sound reproducing units and their associated control relays are common to all lines and all stocks. The control relays and the sound reproducing units are interconnected to the several selectors and so designed to respond to various circuit combinations and vocally reproduce the setting of the price dials, that is, a unit consists of groups of sound bands as L and M and groups of sound band control relays G—G and H—H, and digit finding switch E comprise one unit common to all the digit switches D—D and the several price dials broadly indicated A.

The driving mechanism R for group of sets of sound bands L and M is shown with an individual motor drive 199 but in practice there would be one common power means for all the driving mechanism of a complete system which also includes a group of control relays generally denoted S for the bid and ask sound bands 170 and 171 respectively of group L; the driving mechanism T for group of sets of sound bands N and P, and lastly a group of control relays U for the bid and ask sound band groups N and P.

Each stock is provided with a price dial unit or group comprising four price dials as 10, 11, 12 and 13. Dials 10 and 11 are respectively for the integer and fraction of the bid price. Dials 12 and 13 are for the integer and fraction respectively of the ask price. These dials are mounted on suitable framework and positioned near the trading posts of the various stocks and manually adjusted from time to time by an attendant who hears the prices as called.

Associated with the bid and ask dials 10 and 12 are contacts as 14, 15, 16—21 for the units in the price, from one to nine. The tenth contact as 21 is dead or ineffective. Associated with the bid and ask dials 11 and 13 are contacts as 22, 23, 24—28 for the fractions in the price, from ⅛ to ⅞ respectively.

Corresponding contacts of the bid and ask dials 10 and 12 are multipled by conductors 29, 30—37 respectively. Corresponding contacts of the fraction bid and ask price dials 11 and 13 are likewise respectively multipled by conductors 38, 39, 40—44. Conductors 29 to 37 inclusive are connected respectively to the first contacts as 45 of the banks of contacts AB, AC, AD, AE, AF, AG, AH, AJ and AK. For example conductor 29 is multipled to corresponding contacts 14 of the units bid and ask dials 10 and 12 and to first contact 45 of bank AB. Conductor 30, multipled to corresponding contacts 15 of the units bid and ask dials 10 and 12, is connected to the first contact 46 of the corresponding bank of contacts AC. In like manner, conductors 31 to 37 are respectively connected to the first contacts of their corresponding banks of contacts.

Fraction price circuit 38, multipled to corresponding contacts as 22 of the fraction price dials 11 and 13, say for stock #1, is connected to the first contact 46 of bank BD in the fraction set of banks of contacts of selector switch E. The other fraction price circuits 39 to 44 inclusive are likewise respectively connected to the first contacts as 46 of banks BE, BF, BG, BH, BJ and BK.

The units price circuits 47 to 55 inclusive are multipled to corresponding contacts of the units price dials 10 and 12, for stock #2 and respectively terminate in the second contacts as 56 of the banks AB, AC, AD, AE, etc. The fraction price circuits 57 to 63 inclusive, multipled to corresponding contacts of the fraction price dials 11 and 13 for stock #2, terminate respectively in the second contacts as 64 of the fraction price banks BD, BE, BF, BG, BH, etc. In the same manner, other price dial units would have their corresponding contacts multipled and connected to corresponding contacts of their corresponding banks.

In order that the several digit finding switches may have access to a plurality of switches, corresponding contacts of the units set of bank of contacts as AB, AC, AD, etc. of the digit finding switch E, are multipled to corresponding contacts of the units set of bank of contacts as CA, CB, CD, etc. of the digit finding switch F. For instance, the first and second contacts as 45, 56, etc. of the various unit banks of switch E are multipled to the first and second contacts, 68, 69, etc. in corresponding unit banks of contacts CA, CB, CD, etc. of switch F by conductors as 65 and 66 respectively. In like manner, corresponding contacts in corresponding banks of contacts of the fraction set of banks of switches E and F are multipled. Thus, it is apparent that there is a bank of contacts for each integer and a bank for each fraction in the price and a contact in each bank for each corresponding set of bid and ask price dials.

Each price dial of the several price units carries a wiper as 70 to contact with the several associated contacts arranged in a semi-circle, there being a contact for each point in the price. Associated with a set of bid and ask price dials as 10 and 11 of the several price dial units is a slow release relay 73, for the purpose of preventing intermingling of numbers if a price change is made during the course of transmission of a previous price. The movement of a price dial actuates contact spring 72, grounding contact as 71, energizing slow release relay 73, opening contact as 74, and closing contact 75, which holds relay 73 locked up during the movement of the sound bands, if they be in motion at the time the price dials are adjusted. If relay 73 is energized, contact 74 is opened preventing energization of the sound band control relays as will be later described.

Figure 3:
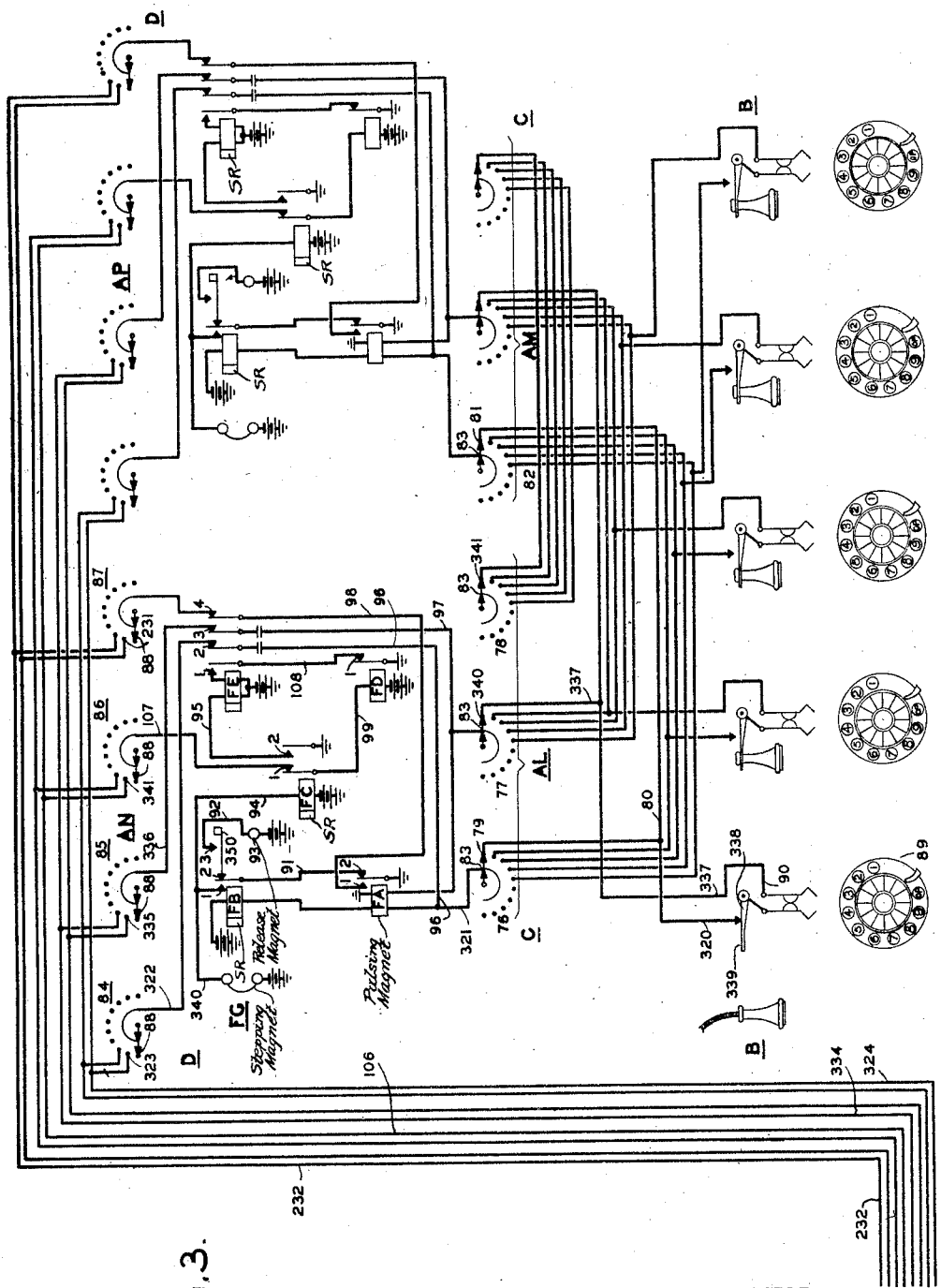
Fig. 3 shows schematically five telephone stations connected by line circuits to line finding switches which in turn are connected to the digit switches.
Figure 4:
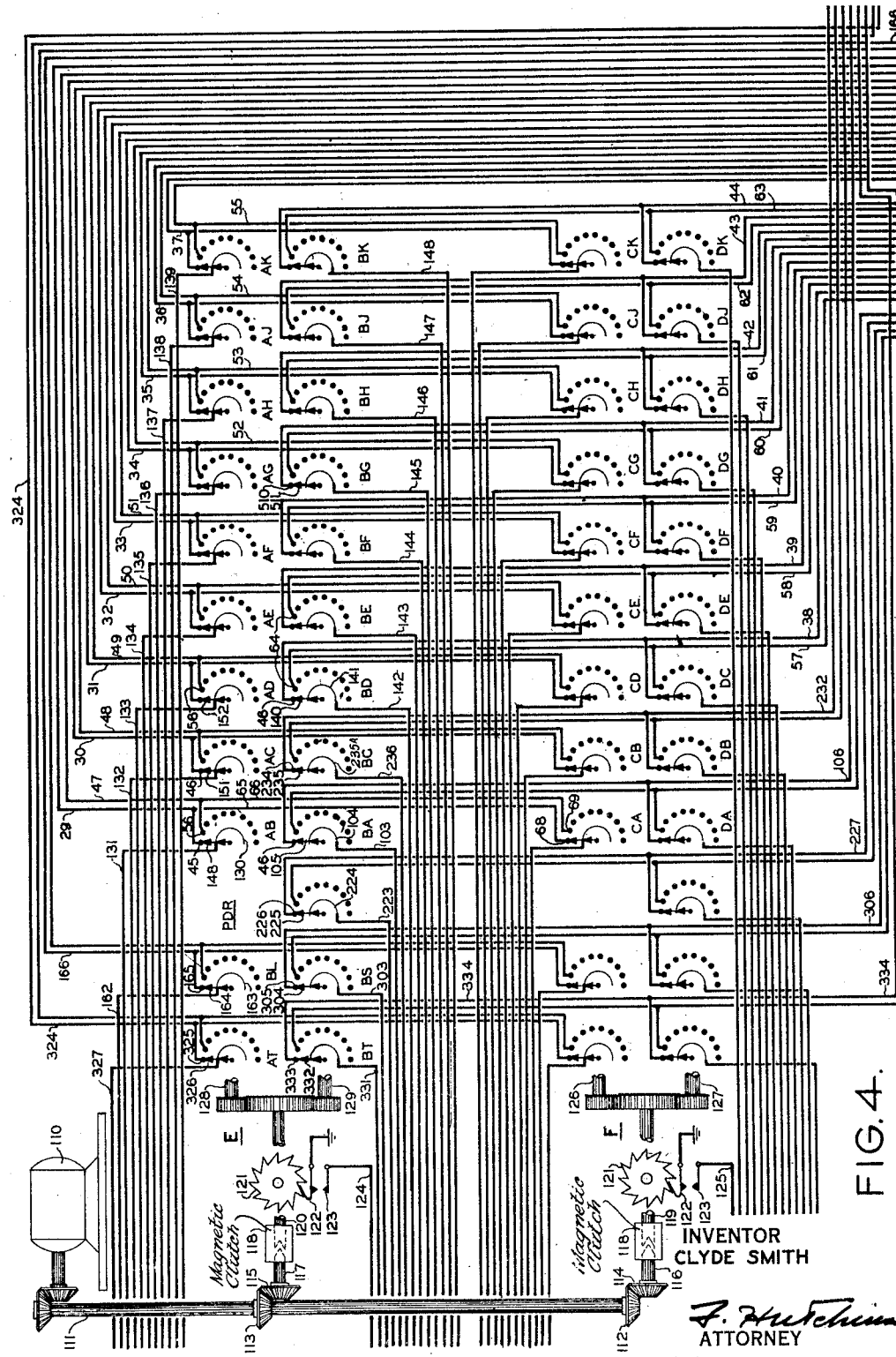
Fig. 4 shows schematically the circuits of two digit switch finders each common to the digit switch and the stock groups.

For the purpose of this description, the control circuits of the line finders, Fig. 3, the digit switches, and the digit switch finders in Fig. 4 are omitted as many different control circuits may be employed, as is well understood in the telephone art.

In Fig. 3 two line finding switches broadly denoted AL and AM are schematically shown. Their purpose is to pick up a calling line on the removal of a receiver from the hook of an automatic telephone. Each line finder switch includes three banks of contacts as 76, 77 and 78. Each contact in each bank is multipled to a like contact of a corresponding bank of other line finding switches, as for example, contact 79 is multipled by conductor 80 to a corresponding contact 81 of like bank 82 of the line finding switch AM in order that all calling lines may have access to any of the line finding switches, which are less in number than the lines, as is well understood.

Each line finding switch includes a wiper 83 for each bank. They are mounted on a common shaft and move in unison and may be of the well known step by step or power driven type. The step mechanism is omitted as it is well known in the telephone art. Each line finding switch is tied directly to the digit switches generally indicated AN and AP. It follows, therefore, that if a line finding switch picks up a calling line, the latter has facilities for extending the connection. The system, as illustrated, shows but two line finding switches and two digit switches, but any number of these may be employed where the system is to be extended.

The digit switches AN and AP, Fig. 3, are for the purpose of selecting a stock. They also set up circuit combinations to cause the digit finding switches as E and F (Fig. 4) to seek a calling digit switch in the same manner as the line finding switches seek a calling line. The digit switches may be of the conventional step by step or power driven type. Only such circuits as are peculiar to the system are shown, as there are various circuits well known in the telephone art for controlling this type of switch.

However, for the sake of simplicity and understanding, the digit switches are shown as single motion switches with a capacity of nine numbers. They can just as well be of the well known two motion design with a capacity of one hundred numbers, or of the single digit and trunking hunting type, known as first selectors. Used as first selectors, the contracts would terminate in connectors and the wires now terminating on the bank of contacts would terminate on the contacts of the connectors.

Each of the digit switches AN and AP are provided with four sets of banks of contacts 84, 85, 86 and 87, and each bank of contacts is operatively associated with a wiper 88, all of which are mounted on a single shaft and move in unison, being responsive to the impulses from one of the dials 89, Fig. 3, associated with a corresponding telephone receiver 90. The stepping and releasing mechanism is omitted as it is well known in the telephone art.

Associated with each digit switch (Fig. 3) is a set of control relays as FA, FB, FC, FD and FE. Relay FA is the stepping relay and is first energized through the telephone when the line finder finds the calling line. Also, it later responds to each pulse from a dial. After the dialing pulses have been sent, it remains energized during the connection. During the energization of stepping relay FA, slow to release relay FB is also energized and remains energized during the pulsing period, closing its front contact 1, preparing a circuit to the stepping magnet coils FG which are energized once for each pulse from closed contact 2 of stepping relay FA when the latter is deenergized after the operation of a dial.

When the digit switch AN steps forward from the dial pulses, cam spring 350 closes, establishing a circuit from back contact 2 of stepping relay FA, conductor 91, closed contact 2 of stepping relay FB and conductor 92, to release magnet coil 93 which releases its respective digit switch when the calling party hangs up in a manner well understood in the art.

During the pulsing period, slow to release relay FC is also energized from closed contact 2 of the stepping relay FA, conductor 91, closed contact 1 of slow to release relay FB and conductor 94. The purpose of slow to release relay FC when energized is to energize and lock up cut off relay FE, which closes its locking contact 1 and opens its contacts 2, 3 and 4.

Open contacts 2 and 3 of cut off relay FE disable a transmission circuit including conductors 96 and 97. Open contact 4 of cut off relay FE disables a start circuit which includes conductor 98.

On completion of the pulsing period, contact 1 of slow to release relay FC closes, preparing a circuit for the operation of relay FD. This circuit includes contact 101 at the zero position of starting cam 100, Fig. 7, through conductor 102, contact 4 of the interference preventing slow release relay FH (Fig. 5), conductor 103, common 104 and wiper 105 of bank of contacts BA (Fig. 4), a contact as 46 thereof, conductor 106, a selected contact of bank 86 of digit switch AN (Fig. 3), conductor 107, contact 1 of relay FC, conductor 99 and the winding of relay FD. Thus relay FD is energized on the completion of the dialing operation, opening its contact, and de-energizing cut off relay FE, thereby closing transmission conductors 96 and 97 and the start circuit 98.

The purpose of the cut off relay FE is to maintain a calling line disconnected from the digit switch until wipers 88 thereof have reached their selected and predetermined positions. Also the wipers may reach their selected contacts at a time when the sound bands are serving another caller, and if a calling line has access to sound bands at any stage of their operation, fragmentary prices would be heard. For this reason cut off relay FE is energized at the beginning of the dialing period, and is held energized until the digit switch AN has been set to the selected position and until the sound bands have reached the starting position, if the sound bands be off, this position at the time of a call. Relay FD, when energized, releases cut off relay FE. Relay FD is energized only when the sound bands to which it may be then connected reach their starting point and this takes place at the zero position of the start cam 100.

The digit switch finders E and F (Fig. 4) are a connecting link between the digit switches AN and AP (Fig. 3) and the price dials (Fig. 2) of the various stocks and are common to all the digit switches and a plurality of price dials. As illustrated, the digit switch finders are of the line finding type and power driven by motor 110, driving shaft 111 carrying beveled gears as 112, 113, driving complemental gears 114 and 115, respectively actuating shafts 116 and 117. Each of the shafts 116 and 117 includes a magnetic clutch 118 of a well known type for driving, if engaged, shafts 119 and 120. Each of the shafts 119 and 120 carries a toothed wheel or ratchet 121, which upon each movement causes an associated grounded spring 122 to close a contact 123, to energize relays FH (Fig. 5) and FJ (Fig. 6) which opens their contacts to prevent interference, that is, preventing premature energization of the control bid and ask relays as MA, MB; NA, NB (Fig. 7) during the passage of the wipers of the various digit finding switches E and F (Fig. 4) over bank contacts.

Shafts 119 and 120 are connected with suitable gearing for driving shafts 126 and 127; 128 and 129, to which the various wipers of the several banks of digit finding switches are connected. The method of driving the digit switch finding shafts and controlling circuits therefor may be of any of the several types well known in the telephone art, the controlling circuits being omitted from the description. Thus it is apparent, that so long as the magnetic clutches 118 are engaged, interference preventing relays FH (Fig. 5) and FJ (Fig. 6) are energized, disabling the circuits controlled thereby.

Preferably, each digit finding switch E and F (Fig. 4) consists of two groups of banks of contacts, and each bank includes an associated wiper and all the wipers of a row are attached to a common driven shaft as 126, 127, etc. and all the wipers of a row move in unison. The direction of rotation of the various wipers is illustrated as moving in a clockwise direction. However, while but two groups of banks are herein disclosed and illustrated with each digit finding switch it should be borne in mind that a digit finding switch may be provided with as many groups of banks of contacts as may be needed where a bid and ask price of a stock or commodity to be announced is in more than an integer and a fraction.

Wipers of digit finding switch E as 148 and their associated commons as 130 of the banks of contacts AB, AC, AD, AE, AF, AG, AH, AJ and AK are respectively connected with conductors 131, 132, 133, 134, 135, 136, 137, 138 and 139 to the units sound band control relays GA, GB, GC, GD, GE, GF, GH, GJ and GK (Fig. 5). There is a wiper for each unit price sound control relay, and a control relay for each digit in the price, as for example, relay GA is for "one" in the price, GB for "two" in the price, etc.

The wipers as 140 and associated commons as 141 of the fraction row of banks BD, BE, BF, BG, BH, BJ and BK (Fig. 4) are respectively connected with conductors 142, 143, 144, 145, 146, 147 and 148 and their associated fraction sound control relays HA, HB, HC, HD, HE, HF and HG (Fig. 5), there being a wiper for each fraction price sound control relay and a control relay for each fraction in the prices, as relay HA is for "⅛" in the price, HB for "¼", HC for "⅜", etc.

In a similar manner, the wipers and associated commons of the unit banks of contacts CA, CB, CD, etc. of digit finding switch F are connected to their corresponding units price sound band control relays JA, JB, JC, etc. and the wipers and commons of the fraction banks of contacts DC, DE, DF, etc. are connected to corresponding fraction sound band control relays KA, KB, KC, etc.

A digit finding switch as E or F is set in motion when a digit switch as AN or AP engages a contact not then being served by another digit switch. Thus one digit switch and its associated relays and sound bands will serve at the same time a plurality of calling lines.

Sound band control relays at G—G and H—H are in pairs, arranged in numerical order with a pair of relays for each integer and fraction. Relays GA and GL comprise a pair for the number one digit in the units of the price. Relays GB and GM are a pair for the number two digit in the price. Relays GC and GN are a pair for the number three digit in the price, etc. Pairs of relays HA, HJ; HB, HK; HC, HL; HD, HM, etc. are for the fractions in the price ranging respectively from ⅛, ¼, ⅜, ½, etc.

In the group of sets of relays from J—J (Fig. 6), pairs JA, JE; JB, JF; JC, JG, etc. are for units in the price varying from one, two, three, etc. respectively. In the group of sets of relays from K—K, pairs of relays KA, KF; KB, KG; KC, KL, etc. are for fractions in the price varying from ⅛, ¼, ⅜, etc.

Pair of relays GA and GL control the operation of the number one digit sound band 150 (Fig. 7). Relays GB and GM control the operation of number two digit sound band 151 (Fig. 7). Relays GC and GN control the operation of the number three digit sound band 152 (Fig. 7). Other like positioned sets or pairs of sound band control relays control other corresponding sound bands.

The pair of relays HA and HJ control the operation of the one-eight fraction sound band 153 (Fig. 7). Relays HB and HK control the operation of the one-quarter sound band 154, etc. Other like pairs of relays of the group H—H control the operation of corresponding fraction sound bands in group M.

In like manner, pairs of relays (Fig. 6) as JA, JE; JB, JF; etc. of the units price group of sets of control relays from J—J control the operation of the number one, number two digit price sound bands 155, and 156 (Fig. 8) respectively, of group sound bands N; and the pairs of relays as KA, KF; KB, KG; etc. control the operation of fraction sound bands 157, 158, etc. for ⅛, ¼, etc. in the price. The sets of relays in groups G—G and H—H and the sets of relays in groups J—J and K—K serve for both the bid and ask price.

Sound band control relays as GA, GB, etc. for the units in the price, and sound band control relays as HA, HB, HC, etc. for the fractions in the price are selectively first energized from sets of a group of stock dials as A (Fig. 2) that have been set and the digit finding switches have responded to the operation of the digit switches, upon the closure of contact 160 from the energization of the bid relay MA (Fig. 7), grounding conductor 161, closed contact 7 of preventing interference relay FH, conductor 162, common 163, wiper 164 of bank BL, a contact as 165, conductor 166, closed contact 74 of relay 73, conductor 167 to wipers as 70 of the bid and ask set of price dials 10 and 12, contacts as 14, conductor 29, contact 45 of bank AB, wiper 148, common 130, and conductor 131, energizing relay as GA, or relays as HA may be energized from closed contact 160 through the same circuits as just described to wipers as 70 of the fraction price dials as 11 and 13 and contacts as 22 thereof, conductor 38, contact 46 of bank BD, wiper as 140, common 141 and conductor 142, energizing one-eighth fraction relay HA. Other sound band control relays as GA and HA of groups as G—G and H—H may be selectively energized depending upon the setting of the individual wipers of the various price dials of the several stock groups.

However, before either a bid or ask price is announced, the bid sound band 170 (Fig. 7) is actuated, if there be a bid price. This is accomplished upon the release of bid relay MA and continued energization of its associated mate relay MB, grounding circuit 172, energizing electromagnet 173, attracting armature 174 against the energy of spring 205, causing clutch complement 175, which is slidably and rotatably mounted on driven shaft 72, to engage its complement clutch portion 176 which is loosely mounted on shaft 72 causing bid sound band 170 to be put in motion for one step in a cycle of operation, which takes place during one-third of a revolution of sound time control band cam 177.

Following this operation, a selected units price sound band of group L is made effective and this takes place upon deenergization of a sound band control relay as GA, at the beginning of another step in the cycle of operation and continued energization of a mate relay as GL until the end of this step in the cycle of operation, and during the latter, closed contact 179 of relay GA grounds conductor 180, closed contact 181 of relay GL, conductor 182, energizing clutch electromagnet 183, attracting armature 185, causing clutch complements 186 and 187 to engage, rotating the number one digit sound band 150 for one cycle of operation requiring, however, one-third of a revolution of the sound band time cam 177.

If the selection were for two units in the price, relays GB and GM are selected, which in turn operate circuit 188, causing clutch magnet 189 to be effective, placing in motion number two digit sound band 151. In like manner, pairs of relays GC, GN; GD, GQ control the operation of their corresponding sound bands 151, 152 respectively, etc.

Upon the completion of the units bid price, a selected pair of fraction control relays become effective, if the price to be transmitted contains a fraction. The unit pair of sound control relays just selected and operated now becomes ineffective. If the fraction of the price were one-eighth, relays HA, HJ (Fig. 5) operate, grounding circuit 190, energizing clutch magnet 191, causing one-eighth fraction sound band 153 to be set in motion for the last step in the cycle of operation which takes place during one-third of a revolution of sound time cam 177 (Fig. 7). At the end of this cycle the relays HA, HJ become ineffective.

Following the transmission of the bid price, the ask sound band 171 (Fig. 7) is set in motion for one step in a new cycle of operation which is followed by the ask price and if the latter be in one integer and a fraction, a pair of units and fraction sound band control relays of groups as G—G and H—H are selected in proper order; or if the asked price involves but an integer or a fraction only, then only a pair of sound band control relays in either of groups G—G or H—H is selected.

The fraction sound bands (Fig. 7) as 153 and 154 are suitably mounted on driven shaft 194 carrying gear 195 driven by gear 196, which in turn is driven by units price band shaft 72 actuated by clutch complements 206 and 207 and stub shaft 250 operated by gear 197 actuated by gear 198 associated with the motor 199. Each sound band contains a voice reproducing record, here illustrated as of the phonograph type, which cooperates with an electrical contact or pick-up as 200 (Fig. 7) electrically associated with a transmission circuit including conductors 201 and 202. The electrical contact as 200 is responsive to the track in the record of its associated sound band.

Each of the slidable clutch complementary members as 175 associated with the sound band drive shafts as 72 and 194 includes a slot 203 cooperating with an individual guide pin such as 204 suitably fixed to the shafts, and each armature as 174 of the various clutches includes a spring 205, normally holding an associated pair of complementary clutch members inoperative.

Associated with the power driving means 199 (Fig. 7) and suitably mounted on the sound band operating shaft 72 and drive stub shaft 250 are the complementary clutch members 206 and 207 respectively, which when engaged by the operation of clutch magnet 208 drive the sound band shafts as 72 and 194 during the periods of transmission. The time interval of a period of transmission may vary for the bid price: it may be in one integer and the asked price in an integer and fraction. Also various stocks may be differently priced at the posts or trading stations in the exchange: one may be in an integer only or in a fraction only, another in one integer and a fraction. In this system the circuits and mechanisms are so arranged that the operating time for a price with one integer and a fraction is two-thirds the operating time of a price with two integers and a fraction.

To control the operating time for various transmission periods, there is provided a sound time cam 177 mounted on shaft 72 and a time starting cam 100 secured to shaft 210. Sound time control cam 177 has three indents 211, 212 and 213 spaced one hundred and twenty degrees apart, providing three equal circumferential portions, one for controlling the bid sound band 170, one to control the sound band as 150 for an integer in the price, and one to control a fraction sound band as 153.

Associated with the time control sound cam is a make before break switch broadly denoted X comprising an indented spring 214 and contacts 215, 216 and 217 for a purpose hereinafter described. It should be noted that upon movement of spring 214 out of the indent on the sound band controlling cam 177, contact 215 makes before contact 216 breaks. The circuits operated by cam 177 through its spring contacts 215, 216 and 217 and bid relays MA and MB are so controlled that no matter where this cam may stop after a bid operation, the first step on the next cycle will cause the ask sound band as 171 to become operative, if there be an ask price.

A complete operating period comprises one or more cycles, including time intervals for the transmission of the word bid followed by the bid price in either an integer or fraction or in both, and the transmission of the word ask followed by the asked price in either an integer or fraction or in both an integer and fraction, and if the system were extended there would be additional operating steps in the cycles for the transmission of the tens and hundreds of the bid and asked price in a complete transmitting period.

As illustrated, sound band time cam 177 is at the beginning of an operation with spring 214 in indent 211. Upon movement of the cam from indent 211 to indent 212, the word bid is transmitted. The next step in the cycle takes place as the came moves from indent 212 to indent 213, causing the units in the bid price to be transmitted. The next step occurs during the movement of the cam from indent 213 to 211 and in this time the fraction in the price is transmitted. The next step occurs during progression of the cam from indent 211 to 212 and the word ask is transmitted. Upon movement of the cam from indent 212 to 213, the units in the asked price is transmitted, and upon movement from 213 to 211 the fraction in the asked price is transmitted.

For one complete operating period start cam 100 makes one revolution.

Start cam 100 causes cut off relay FE (Fig. 3) of a calling line to be deenergized connecting the transmitting line through the sound bands, if a sound band unit is at its zero position and contact 101 is closed, but if the latter is open on the off zero or off neutral position of start timing cam 100 at the time the calling line is extended to the selected contact, cut off relay FE will remain energized until cam 100 is returned to its zero position. This action prevents the calling line from hearing fragmentary reports at a time when a sound band unit is serving other calling lines. A calling line is one associated with a telephone having its receiver removed. The zero or neutral position of start time cam 100 occurs when spring 219 of make before break switch Y registers with indent 220.

Another purpose of the time cam 100 is to preclude double registration of a price, if a price dial of sets or groups as A is adjusted during the transmission period, and in actual practice this very often occurs. Contact 221 of the make before break switch Y is for this purpose. If closed on the off zero position of cam 100, a circuit is set up holding relay as 73 (Fig. 2) of the several price dial groups locked up during one operating period.

The circuit for preventing double registration includes grounded spring 219, closed contact 221, conductor 222, closed contact 5 of relay FH, conductor 223, common 224, wiper 225 of bank PDR of digit finding switch E, contact as 226, conductor 227 and closed contact 75 of relay 73, which is momentarily energized upon movement of a price bid dial as 10 or 11, opening contact 74, preventing energization of a sound band control relay from contact 160 of bid relay MA. If price asked dials 12 and 13 are adjusted during the transmission period, their associated relays as 73 are held locked up, opening its contact 74, preventing the energization of a selected asked sound band control relay during the transmission period. In other words, if while a sound band unit is transmitting the price and dials as 10, 11, 12, 13 are adjusted, their associated relays as 73 lock up and remain energized during the operating period, preventing wipers 70 of these dials from being momentarily grounded to energize sound band control relays as GA and HA.

At the beginning of an operating period, cam 100 is at its neutral position and contact 230 thereof is closed for starting the sound bands on their cycle of operation, and in this closed position, it is grounded from closed contact 1 of stepping relay FA (Fig. 3) so long as a calling line is active. Ground from FA1, namely, closed contact 1 of relay FA, is extended to energize the bid sound band control relay MA (Fig. 7) which is always the first control relay to become effective, if there be a bid price, for reproducing the record of the bid sound band 170.

This start circuit includes grounded closed contact FA1, conductor 98, closed contact FE4, wiper of bank 87, a contact thereof as 231, conductor 232, contact 234 of bank BC, wiper 235, conductor 236, closed contact FH3, conductor 237, closed contact 230, conductor 238, bid control relay MA and battery.

Sound control time cam 177 (Fig. 7) has choice of three starting positions while the start cam 100 has but one starting position. The bid price may be in one interger or a fraction on one operation and an integer and a fraction on the next operation. Therefore, start cam 100 must adjust its movements to various combinations of operations. To provide for varying conditions, start cam 100 is mounted on the independent shaft 210 which is driven through gears 239, 240 and clutch complements 241 and 242 at a ratio of one revolution to six revolutions of the driving shaft 72.

To restore start cam 100 to its neutral position, at the end of a complete operation irrespective of the number of operating steps in the cycles required in a bid and ask price operation, start cam shaft 210 operatively includes a coiled spring 243 having one end fixed thereto and its other terminal portion attached to a fixed element 244 suitably disposed adjacent the start cam shaft.

Clutch complements 206 and 207 are meshed through the operation of electromagnet 208 which has two sources of energization, namely, one from grounded closed contact 3 of ask relay NB and conductors 245 and 246, and the other from grounded closed contact 2 of slow release relay W (Fig. 7) through conductors 247 and 246.

Contact 2 of slow release relay W, read as W2, is effective on the bid operation. It is also effective at the interval between the bid and ask operations. That is to say, after the last sound band relay in the bid operation is released and the control relays for the ask operation are energized, closed contact W2 continues to hold clutch magnet 208 energized for the remainder of the operating period. At the completion of the bid and ask operations, clutch magnet 208 releases, freeing clutch complements 206, 207; 241 and 242. The start cam 100 accordingly returns to its neutral position by reason of the operation of coiled spring 243.

Clutch complement 206 is loosely mounted on a stub shaft 250 which carries gear 197. Associated with complement 206 is the sleeve 251 comprising slot 252, guided by pin 253 fixed to shaft 250. Sleeve 251 and complement 206 move in unison and operatively disposed between these members is the depending armature 254 to which, at one end, is rotatably secured start cam shaft 210.

Clutch complement 207 is rigidly secured to sound band control shaft 72. Thus it follows, if clutch magnet 208 is energized, armature 254 operates to move clutch complements 206 and 242 into engagement with clutch members 207 and 241 respectively, causing shafts as 72, 210 and 194 to take motion, keeping in mind, however, that upon the release of magnet 208 at the end of a period of operation, clutch members 206, 207; 241, 242 disengage, causing start cam 100 to return to its zero position with the spring indent 219 registering with detent 220 causing contacts 101 and 230 to be grounded, releasing cut off relay FE (Fig. 3) and extending ground from closed contact 1 of stepping relay FA (Fig. 3) to energize a bid relay as MA (Fig. 7), respectively, that is, closed contacts 101 and 230 set up circuits to start another cycle of operation if a calling line be waiting.

In this system, one unit of sound band control relays and one unit of sound bands are employed for both the bid and ask operations. Therefore the control relays for the ask sound band must not be effective until the bid operation is complete, if there be a bid price, and irrespective of the number of digits and a fraction in the bid price, the ask operation is withheld until the bid operation is complete. The ask operation must also immediately follow the bid operation without any dead time, namely, a silent interval due to the absence of either a unit or fraction in the bid price.

This action takes place by the operation of contact 217 associated with sound control time cam 177. This contact is closed at every one-third of a revolution due to the operation of indents 211, 212 and 213 of cam 177. In closing, a circuit is established to energize ask sound band control relay NA from closed contact W1 and Z2 (Fig. 7), which are closed only after a cycle of operation of selected sound band control relays as in Figs. 5 and 6. That is to say, relay Z releases on the completion of the announcement of each bid price momentarily, but relay W is slow to release. When relay Z (Fig. 7) is energized, contact 3 thereof closes, energizing relay W through conductor 260, closing its contacts 1 and 2. Traced, the asked control relay circuit includes grounded closed contact W1, conductor 261, closed contact Z2, conductor 262, closed contact 217, conductor 263, ask sound band control relay NA and battery.

Pairs of control relays MA and MB; NA and NB govern respectively the operation of the bid and ask sound bands as 170 and 171. Bid relays MA and MB are first to operate in a period of operation. Following their operation, ask relays NA and NB operate. Immediately at the conclusion of the bid price operation, if there is a bid price, ask control relays NA and NB are energized and become effective. Following this, selected price band control relays (Fig. 5), which respond to the setting of ask dials as 12 and 13, become effective.

Of the pair of bid relays MA and MB, the former includes two windings as 264 and 265 and it is first momentarily energized through winding 264 when the caller's receiver is off the hook, and remains energized from closed contacts 230 and 216 until shafts 72 and 210 overcome the inertia of the cams and open these contacts. The start circuit initially energizes relay MA and includes conductor 238, closed contact 230, conductor 237, closed contact FH3, conductor 236, wiper 235 of bank BC, a contact as 234, conductor 232, a contact as 231 and wiper 88 of bank 87, closed contact FE4, conductor 98, closed contact FA1 and ground.

The momentary energization of relay MA locks up its associated contacts 160, 266, 267 and opens contact 268. In closing, contact 160 energizes selected sound band control relays of the same numerical value corresponding to the setting of the bid dials as 10 and 11.

Closed contact 266 continues to hold, through winding 265, relay MA energized when the make before break switch X registers with one of its indents at the beginning of its operation. Traced, the holding circuit comprises winding 265, closed contact 266, conductor 273 and closed contact 216. Closed contact 268 grounds conductor 269, energizing mate control relay MB whereby its associated contacts 270, 271 and 272 are closed. It should be noted that the start circuit associated with relay MA is disabled when sound time control cam 177 is out of registration with an indent riding on the cam periphery and this occurs when it takes motion, but relay MB is held energized through its locking contact 270.

Relay MB having energized from closed contact 268, remains locked up for one-third of a revolution of cam 177 through winding 274, closed contact 270, conductor 275 and closed contact 215. In operating, relay MB locks up and completes a circuit from the normally closed contact 267 of relay MA and closed contact 271 of relay MB through conductor 172 to magnet 173 of the bid sound band 170 during movement of cam 177 from the first to the second position. In energizing, magnet 173 operates to engage clutch complements 175 and 176 placing bid sound band 170 in motion. In this connection it should be noted that in closing, contact 272 of relay MB grounds conductor 276 providing a common locking circuit for a selected sound band control relay as GA.

For operating the ask sound band 171, relays NA and NB serve a like purpose. They operate only after the bid operation is complete, or if there is no bid price they act without a dead time interval. The operation of relay NA is therefore delayed until the bid operation has ended, if there is a bid price. This may occur at the conclusion of the announcement of the integer in the bid price or at the end of the fraction. To delay the operation of the ask control relays NA and NB, slow release relay W remains energized following relay Z releases momentarily after the bid operation, that is to say, after the complete announcement of the bid price which may be in an integer or fraction or in both.

Relay Z (Fig. 7) is energized when a control relay as GA in the integer group or HA in the fraction group is selected. If selected, relay GA closes contact 280, grounding conductor 281, energizing mate relay GL, closing contact 282 which grounds conductor 283, energizing relay Z, opening its contact Z2, disabling ask control relay circuit 262.

Relay Z, however, has another source of energization and remains energized so long as an integer or a fraction sound band control relay or both, is selected for a bid price. After the announcement of the integer in the bid price relays, relay GL releases, but relay Z is held up due to a selected pair of fraction relays as HA and HJ.

If energized, relay HA (Fig. 5) closes contact 284 grounding conductor 285, energizing mate relay HJ, which closes contact 286, grounding conductor 287, which forms the second source of energization for relay Z, opening its contact Z2 continuing to hold open asked control relay circuit 262. After the announcement of the fraction in the bid price, relay HJ releases, removing ground from conductor 287, momentarily releasing relay Z, closing its contact Z2, establishing a grounded ask circuit 262 to relay NA from closed contact W1. If the bid price contained no fraction, relay Z would momentarily release after the announcement of the units in the bid price and without any dead time establish the ask relay control circuit 262 to render relay NA effective.

In the event that the system were extended to announce prices in more than an integer and a fraction, additional groups of pairs of sound band control relays as GA, GL; HA, HJ would be provided in a unit and consequently relay Z would contain a proportional number of sources of energization, as is well understood.

Relay Z releases at a time when sound band time control cam 177 is at one of its three zero positions, thus completing the ask start circuit to relay NA. Traced, this circuit includes grounded closed contact W1, conductor 261, closed contact Z2, conductor 262, closed contact 217, conductor 263, energizing ask control relay NA through winding 288, closing its contacts 289 and 290 and opening contact 291. Once energized, relay NA locks up through winding 292 and closed contact 289, conductor 273 and closed contact 216 of switch X which is closed at one of the three zero positions of cam 177. Relay NA remains energized until cam 177 takes motion opening contact 216.

In closing, contact 290 grounds conductor 293, energizing through winding 294, mate ask control relay NB, closing its associated contacts 1 to 5 inclusive simultaneously. Closed contact NB1 holds relay NB locked for one-third of a revolution of cam 177 through winding 295, conductor 275 and closed contact 215 in the off zero position of cam 177, and in this position contact 216 opens, removing ground from conductor 273, releasing relay NA, closing contact 291, grounding conductor 296, closed contact NB2, conductor 297, energizing clutch magnet 298. This operation meshes clutch complements 299 and 300, causing ask sound band 171 to take motion.

Closed contact NB3 continues to hold clutch magnet 208 energized through grounded conductor 246 which also is continued grounded by the clutch magnet circuit 247 through closed contact W2.

In other words, clutch magnet 208 is held energized for a period of operations which may include a cycle of operations for a bid and asked price, or a period may consist of a cycle of operations for a bid price only, if there were no asked quotation, or a cycle of operations may be for the ask price only, if there were no bid price. Concomitantly, closed contact NB4 extends ground to the dials 12 and 13 which had been manually set for the ask price. Traced, the ask dial circuit includes closed grounded contact 291 of relay NA, conductor 296, closed contact NB4, conductor 302, closed contact FH6, conductor 303, wiper 304 associated with bank BS, a selected contact as 305 thereof, conductor 306, closed contact 74 of the ask preventing double registration relay 73 and a branch conductor 307 to which the contacts of ask settable dials 12 and 13 are multipled.

Additionally, contact NB5 in closing grounds common locking circuit 276 for holding selected sound band control relays of group G—G energized on this step of operation. To prevent reenergization of ask control relay NA on completion of the ask operation, that is, on this step of operation, a relay as V is provided which cooperates with contact 308 of make before break switch Y which is closed on the off neutral position of start cam 100 to hold relay V locked through conductor 309 and closed contact 310, if relay V had been previously energized due to the operation of the ask control relays NA and NB.

Relay V (Fig. 7) has two sources of energization, one through winding 311, conductor 312, contact Z1, connected to battery, provided the other source of energization, namely, from closed contact 291 of relay NA, closed contact NB4, which previously grounded the ask dial circuit 302, to which conductor 313 and winding 314A are multipled; has initially energized relay V, which in turn closes contact 310 holding relay V locked in the off normal position of start cam 100.

If a bid price only were set for transmission, a complete period would include only this bid cycle, and the ask circuit 262 is disabled during this cycle, being open at contact Z2. Also, in this connection, relay V would not be energized as the ask control relays are not operated, consequently, ask dial circuit 302 is ineffective to energize relay V. On the other hand, where the price to be transmitted is for an ask quotation only, relay Z is ineffective on this cycle but relay V is energized through the operation of relays NA and NB, establishing the ask dial band circuit 302, grounding only conductor 313, to energize relay V which is held locked up through closed contact 310 during the transmission of the ask price. In energizing, relay V opened contact 314 and removed battery from conductor 315A in series with slow relay W, opening its contacts W1 and W2. Open contact W1 removed ground from conductor 261 and the ask control relay circuit 262. Hence ask control relays NA and NB cannot reenergize on the completion of this cycle of operation. Open contact W2 removed ground from clutch magnet circuit 247 but this circuit is held grounded from closed contact 315, conductor 316 multipled with circuit 247 continuing to hold clutch magnet 208. Upon completion of the ask price, cam 100 returns to neutral opening contact 308, which removed ground from circuit 309 and contact 310, releasing relay V, opening contact 315, removing ground from conductors 316, 247 and 246, deenergizing clutch magnet 208 whereby clutch members 206 and 207 disengage to stop shaft 207.

Each sound band unit as L, M; N, P includes a transmission circuit for transmitting voice reproductions of selected sound bands to the caller at a telephone station. The primary side 202 of this circuit is grounded as 338 (Fig. 3) and operatively includes transmitting contacts as 208 (Fig. 7), multipled to conductor 201, connected with primary coil 317 and battery 318 of repeating coil 319. The secondary circuit includes a conductor as 320, Fig. 3, adapted to be grounded through contact 338 by removal of the receiver of a telephone, a selected contact as 79 of line finding bank 76, conductors 321, 96, closed contact FE2, conductor 322, wiper 88 of bank 84 of digit switch AN, a selected contact as 323 thereof, conductor 324, a selected contact as 325 of bank AT, its wiper 326, conductor 327, closed contact FH1, conductor 328, secondary coil 329, conductor 330, closed contact FH2, conductor 331, wiper 332, a selected contact as 333 of bank BT, conductor 334, a contact as 335 of bank 85, its wiper and common, conductor 336, closed contact FE3, conductor 97, wiper 83 of bank 77 and a selected contact thereof, conductor 337 and to the other side of the receiver 90.

The operation of the system may be best understood by considering an hypothetical example. Suppose it is desired to obtain the last bid and ask stock quotation of the stock, say arbitrarily, International Telephone and Telegraph Corporation. Assume further that this stock is identified by the group of dials in Fig. 1, and that its latest bid price is 2 and the asked 2½. For the bid price, the attendant who follows the trend of prices at the trading post in the exchange adjusts dial or price indicator 10, setting its wiper 70 on the second contact 15. In setting up the ask price, dial or price indicator 12 is adjusted so that its wiper 70 rests on the second contact 15 and dial 13 is set so that its wiper engages the one-half contact 25. In effect, the price dials select the desired price sound reproducing bands after the digit finding switch has found the selected contacts corresponding to the stock number dialed.

The customer at the brokerage office refers to a stock directory and notes the dial number for International Telephone and Telegraph Corporation. First, he removes the receiver from an automatic telephone as 90, causing switch arm 339 to engage contact 338 and if it be assumed that wipers 83, associated with the line finder banks 76, 77 and 78, rest on non busy contacts 79, 340 and 341, it is evident that there will be no switch movement.

The telephone circuits are adapted for calling only. When the broker removes the receiver from the hook, a line finder, as schematically shown in Fig. 3, operates at the central exchange to connect the dialing line to a stock selector switch as AN (Fig. 3).

Upon removal of a receiver from its hook of a dial telephone as 90, an obvious circuit is established energizing stepping relay FA and associated slow to release relay FB, closing respectively contacts FA1 and FB1. The digit switches as AN respond to dialing impulses from dial 89 and on completion of dialing, the digit switch extends four circuits, namely, transmission conductors 322 and 336, circuit 107 for energizing relay FD from closed contact 101 on the zero position of start cam 100 (Fig. 7), and start sound band control circuit 98, through digit finding switches in Fig. 4 and causes one switch to find terminals corresponding to the stock selected to which the four circuits, as 322, 336, 107 and 98, are extended from the stock selecting switch, as is well understood.

During this operation, the calling line is held open at the stock selector (Fig. 3). When, however, the selected digit control switch stops on the selected contacts, the bid and ask audible quotation apparatus associated with this digit switch is started in operation and the calling line is cut through to the transmitting secondary circuit comprising conductors 330 and 328 (Fig. 7) of the repeating coil or transformer 319 through which the reproduced voice currents are passed.

In the example chosen, assume further that the stock selected is listed in the stock directory with a dialing number as 1. The broker dials this number on dial 89. Stepping relay FA deenergizes a length of time for one impulse, closing contact FA2. Relay FB is slow to release and is so timed to remain energized during the pulsing period. Relay FB in energizing closes contact FB1, causing energization of stepping magnet FG for a duration of one impulse, which advances wipers 88 of banks 84, 85, 86 and 87 to the first set of contacts as 323, 335, 341 and 231 respectively, for the stock selected.

Closure of contact FB1 also causes energization of slow to release relay FC during the pulsing period. Closure of contact FC2 energizes cut off relay FE during the pulsing period. Relay FE when energized locks up over its contact FE1, and in opening its contacts FE2, FE3 prevents the caller from hearing fragmentary reports of a previous quotation which may be in progress of transmission. Opening of contact FE4 prevents interference as wiper of bank 87 passes over busy contacts, to wit, prevents contacts of bank 87 from being grounded.

That is, if the sound reproducing bands are in operation at the moment a call comes through, the calling line is held open at F2 and F3 of a selected stock switch until the quotation previously started is fully completed. In this way a caller is prevented from hearing fragmentary quotations.

If several calls are originating at about the same time while a quotation is in progress from a previous call, all will be held open until the quotation apparatus has returned to normal and then all will be simultaneously cut in to hear the next quotation. If no new calls originate the sound reproducing apparatus will complete the quotation and then come to rest.

When, at the end of the dialing, FC releases, FD is energized from contact 101 of switch V, thus causing FE to release and close contacts FE2 and FE3 in the transmission conductors 96 and 97 and closing contact FE4 in the circuit 98.

The movement of the shafts carrying wipers 88 associated with the banks of contacts of the digit switch AN, closed an off normal spring 350, in the circuit of release magnet coil 93. When relays FA and FB deenergize, release magnet coil 93 will be effective to cause the wipers 88 of digit switch AN to restore to normal automatically under the tension of a restoring spring not shown. When the wipers 88 reach their selected position, a starting circuit is set up to put in motion an idle digit finding switch as E. This circuit is not illustrated as it is well known in the telephone art.

However, for convenience of description, it will be assumed that the digit finding switch, E of Fig. 4 responds to after the closure of this selecting circuit, the magnetic clutch 118 is actuated call and the wipers thereof come to rest on the #1 contacts as 45. Rotation of shaft 120 (Fig. 4) causes tooth wheel 121 to actuate spring 122, which engages contact 123 to energize interference preventing relay FH (Fig. 5), opening its contacts 1 to 7 inclusive. That is, relay FH is energized until the wipers of the selected digit finding switch have reached their selected position which takes place upon the release of clutch magnet 118. Control means to hold clutch magnet 118 energized has not been shown, but apparatus for performing this operation is well known in the telephone art.

If shaft 120 is in motion, relay FH is energized, disabling transmission conductors 328 and 330, conductor 237 forming a part of the start control relay circuit, the locking circuit 223 for relays 73 (Fig. 2) associated with the pairs of bid and ask dials as 10 and 11, 12 and 13; conductor 303 forming part of ask dial circuit 306 and finally, conductor 162 forming part of the bid dial circuit 166. In this manner, interference is prevented when the wipers of digit finding switch E pass over busy contacts when seeking a calling line.

After the dialing operation, the wipers of the digit finding switch E engage selected contacts of their associated banks, and the bid dial circuit as 30 of the number two contact 15 (Fig. 2) is extended from closed contact 160 of relay MA (Fig. 7), energizing sound band control relay GB (Fig. 5) which is locked up, energizing its mate relay GM. Relay GM energized closes its contact 360B, energizing relay Z (Fig. 7) which in turn energizes relay W. Relay W energized closed contact W2 which grounds clutch magnet circuits 247 and 246, initially energizing clutch magnet 208, which causes shaft 72 to take motion. In other words, after the setting of the price dials and following the dialing, relay Z energizes, starting the operation of the clutch magnet 208 for a period of operations of cams 100 and 177.

However, at the beginning of a period of operations, cams 100 and 177 stand at normal. In the zero position of start cam 100, contacts 101 and 230 are closed. Closed contact 101, through circuit 102, extending to selected contacts of the several switches, grounds conductor 99, energizing relay FD (Fig. 3) as previously described. Operation of relay FD releases cut off relay FE, causing its contacts FE2, FE3 and FE4 to close. Thus the transmission circuit comprising conductors 96 and 97 and sound band start circuit 98 for bid control relay MA (Fig. 7) are established.

Closure of contact FE4 (Fig. 3) causes energization of relay MA (Fig. 7) over a circuit from battery through left-hand winding of relay MA, conductor 238, contact 230 of switch Y, conductor 237, contact FH3 (Fig. 5), conductor 236, common 235A, wiper 235 and contact 234 of switch BC (Fig. 4), conductor 232, contact and wiper of switch bank AN87 (Fig. 3), contact FE4, conductor 98, and contact FA1 to ground. Relay MA when energized locks up through winding 265, contact 266, conductor 273 and contact 216 associated with cam 177, until the cam comes off normal.

Closure of contact 268 of relay MA, energizes mate bid relay MB, closing contacts 270, 271 and 272. Relay MB locks up through contact 270 when cams 100 and 177 take motion. Closure of contact 160 of bid relay MA causes energization of selected sound band control relay GB (Fig. 5) over a circuit from battery through the right-hand winding of relay GB, conductor 132, wiper 151 and contact 46 of bank AC (Fig. 4), conductor 30, contact 15 and wiper 70 of price dial 10 (Fig. 2), conductor 167, contact 74 of relay 73, conductor 166, contact 165 and wiper 164 of bank BL (Fig. 4), conductor 162, contact FH7 (Fig. 5), conductor 161 and contact 160 of relay MA to ground. Relay GB then locks up over its contact 361, conductor 363 and contact 216 of switch X to ground and energizes relay GM which then locks up over its contact 366, conductor 370 and contact 215 of switch X when the cam 177 operates the switch.

This locking circuit is maintained while the cam 177 makes one-third of a revolution. Closure of contact 271 of relay MB prepares circuit 172 to energize bid clutch coil 173 when relay MA releases and closes contact 268. Closure of contact 272 of relay MB grounds common locking conductor 276, preparing a circuit to hold the units selected relay GB through its closed contact 360.

As above explained, sound band control relay GB is also locked up through closed contact 361. The opening of contact 216 of switch X by cam 177 will not, however, cause the release of relay GB because the other holding circuit therefor through its contact 360 controlled by relay MB remains closed until the word "bid" has been transmitted.

Closed contact 360B of relay GM grounds conductor 283, energizing relay Z, which closes its contacts 1 and 3 and opens contact 2.

Closed contact Z3 grounds conductor 260, energizing slow to release relay W, which closes its contacts W1 and W2. Closed contact W2 grounds clutch magnet lead 247 for continued energization of clutch control magnet 208, meshing clutch complements 206 and 207 starting shaft 72 to rotate, causing cams 100 and 177 to take motion.

Thus, start cam 100 opens contact 230 and sound band control cam 177 opens contact 216. In opening, contact 230 releases relay MA, which opens its alternate contacts and closes its normal contact 267. Mate relay MB, however, is held locked up through closed contact 215 and conductor 275. A circuit is also established through closed contacts 267 and 271 and conductor 172 to energize clutch magnet 173, causing clutch complements 175 and 176 to mesh, setting bid sound band 170 in motion which through its pick up member 370 sends the word "bid" to the calling broker over the transmitting circuit 201, the repeating coil 319 and the secondary transmitting circuits 328 and 330.

During this operation, contact 101 of switch Y is open and prevents relays FD of other lines that may have engaged the same contacts, from being energized. Contact 230 is also open, preventing relay MA from again energizing until cam 100 is reset to zero.

Start cam 100 and sound band control cam 177 now reach one-third of their revolution and indent 212 of cam 177 permits contact 215 to open, releasing bid relay MB which in turn, through the removal of ground from its contact 271, deenergizes clutch magnet 173, disengaging clutch complements 175 and 176 and consequently stopping bid sound band 170. Also, the opening of contact 272 of relay MB opens the circuit through winding 410 of units price band control relay GB, passing control of this relay to contact 216 of switch X.

In the transmission of the units of the bid price, that is 2, as set on price indicator 10, clutch magnet 208 remains energized from contact W2 for continuing cams 100 and 177 in motion. When indent 212 opened contact 215, relay MB was deenergized, opening contact 272, passing control of relay GB to contact 216 of switch X. In continuing its movement, cam 177 opened contact 216 and removed ground from conductor 363, thereby releasing relay GB which closes its contact 364A, causing energization of clutch magnet 189 over a circuit from battery through the winding of magnet 189, conductor 188, contact 387 of relay GM and contact 364A of relay GB to ground. Energization of clutch magnet 189 causes clutch complements 380 and 381 to mesh, putting in motion number two units price band 151, which transmits the word "two", the units of the bid price as set at the exchange on the bid dials.

Cams 100 and 177 have now completed two-thirds of a revolution, spring 219 still rides on the periphery of cam 100 but spring detent 215 is now in registration with indent 213 of cam 177, causing detent contact 215 to open, removing ground from conductor 370 to release relay GM, which in turn removes ground from contact 360B, conductor 283 and winding 385 of relay Z, and consequently releases relay Z, removing ground from its contact Z3.

However, contacts W1 and W2 remain closed for a measurable time after relay Z releases, for relay W is slow to release. Grounded closed contact W2 continues clutch magnet 208 energized. Contact W1 grounds closed contact Z2, the ask control relay circuit 262 and closed contact 217 of switch X, and as contact 217 is momentarily closed, conductor 263 is grounded, energizing through winding 288 ask control relay NA which controls the ask sound band 171.

In selectively carrying out the operation of the sound band control relays as GA for the ask price, ask control relay NA is also momentarily energized from its winding 292 and closed contact 289 through conductor 273 and closed contact 216 of switch X. Contact 290 is also momentarily grounded, energizing winding 294 of relay NB which is continued locked up through winding 295, closed contact NB1, conductor 275, and closed contact 215 on continued movement of cam 177.

Indent 213 now passes off normal, opening contact 216, removing ground from contact 289, releasing relay NA. Contact 215, however, is closed, grounding locking circuit 275 which continues to hold ask control relay NB energized through its contact NB1. In the off normal position of cam 177, relay NA released, closing contact 291 which, through closed contact NB2, extended ground to conductor 297, energizing clutch magnet 298, consequently meshing clutch members 299 and 300 of the ask sound band 171 which takes motion and the word "ask" is transmitted to the calling broker.

Grounded closed contact NB3 continues clutch magnet 208 energized. Closed contact NB4 is also continued grounded by closed contact 291 and grounds conductor 302, closed contact FH6 (Fig. 5), conductor 303, wiper 304 of bank BS (Fig. 4), a selected contact as 305, conductor 306, contact 74 of relay 73 associated with ask price dials 12 and 13 (Fig. 2), wiper 70 of dial 12, wiper 70 of dial 13; number two contact 15 of dial 12 and the one-half contact 25 of dial 13.

Ground from contact 15 of ask dial 12 (Fig. 2) is extended to conductor 30, a selected contact as 46 of bank AC (Fig. 4), wiper 151, conductor 132, energizing the number two units sound band control relay GB (Fig. 5). Ground is also extended from the one-half contact 25 of ask fraction dial 13 to conductor 41, a selected contact as 510 of bank BG (Fig. 4), conductor 145, energizing fraction one-half relay HD (Fig. 5). Relays GB and HD in turn energize and lock up their mate relays GM and HM respectively, as before described.

Closed contacts 291 (Fig. 7) of relay NA and NB4 also grounded conductor 302 and winding 314A of relay V which locks up through winding 311 and contact 310 on which ground is extended from closed contact 308 of switch Y so long as cam 100 is off normal, that is, out of registration with its associated cam spring. Relay V prevents the ask sound band control relays from being reenergized at the conclusion of this cycle of operation, that is, contact 314 being opened disables slow release relay W, opening its contact W1, removing ground from contact Z2 and the ask sound band control relay circuit 262.

Units sound band control relay GM energizing closes its contact 360B, thereby energizing relay Z (Fig. 7) which is also energized from closed contact 600 of the locked up one-half fraction sound band control relay HM over a conductor 287 and winding 385A. Thus, ask circuit 262 is disabled in that contact Z2 therein opens after the word "ask" has been transmitted. But contact Z1 closes. Thus battery is supplied to winding 311 holding relay V energized for the remainder of this cycle, that is, for the transmission of the units and fraction in the ask price.

Relay V having locked up, contact 314 opened, and battery is therefore removed from slow relay W which is prevented from further energization. Closed contact 315 grounds conductor 316 and clutch magnet circuit 247 which continues to hold clutch magnet 208 energized.

During the transmission of the word "ask", selected sound band control relays GB, GM, HD and HM are held energized. Units relay GB is held locked up through closed contact 360, winding 410, conductor 276 and closed contact NB5. Fraction relay HD is held locked up through winding 601, closed contact 602, conductors 604 and 283 and closed contact 360B of relay GM. In other words, a mate relay of the units sound control relays, if selected, holds locked a selected fraction sound band control relay, which in turn holds its mate relay. It should be noted that each relay of groups G—G, H—H, J—J, K—K is provided with two windings schematically indicated by dots as 368 and 369 of relay GM.

Cam spring 214 is now in registration with indent 211 of cam 177, and contact 215 is open, removing ground from locking circuit 275, so that ask mate relay NB is released and its contacts 1 to 7 inclusive open. Open contact NB3 removed ground from clutch magnet circuit 246. But this circuit is continued grounded through closed contact 315 of relay V.

Open contact NB4 removed ground from ask dial circuit 302 which previously caused the several selected sound band control relays GB and GM; HD and HM to lock up. Open contact NB5 removed ground from the units price sound band control locking circuit 276 and control of these relays passes to closed contact 216 at the zero position of cam 177, grounding conductor 363 and a closed contact as 361 of relay GB.

Cams 100 and 177 continue in motion and in the announcement of the units in the ask price, continued movement of cam 177 opens contact 216, removing ground from locking conductor 363, releasing relay GB, which closes its contact 364A, thereby energizing through closed contact 367 and conductor 188, clutch magnet 189, to set in motion the number two sound band 151. The word "two" is now heard by the caller.

In reaching its next successive zero position, cam 177 opens contact 215, removing ground from conductor 370, releasing relay GM, which in turn releases clutch magnet 189 causing clutch members 380 and 381 to disengage, and stop sound band 151. Selected fraction relay HD, however, has been held energized from closed contact 360B of relay GM during the units announcement in the ask price and at the conclusion of the latter, cam 177 reached a zero position closing contact 216, grounding conductor 363 and closed contact 608 which hold relay HD locked up. Contact 700 of relay HD being closed, mate relay HM is energized, closing its contacts 600, 615 and 701. But the cam 177 continues in motion, opening contact 216, removing ground from conductor 363, thereby releasing relay HD, to close contact 702 which cooperates with closed contact 701 and conductor 702 to energize clutch magnet 703, setting one-half fraction price relay 704 in motion. "One-half" is now heard by the caller.

Sound band control cam 177 again reaches a zero position for the last time and opens contact 215, removing ground from locking conductor 370 and contact 615, consequently releasing one-half fraction relay HM. This action causes contact 701 to open, which removes ground from conductor 702, releasing clutch magnet 703, which in turn stops the one-half sound band 704.

In releasing relay HM opened its contact 600. This removed ground from conductor 287, deenergizing relay Z, which opens its contact Z1 and Z3. Open contact Z1 removed battery from conductor 312 deenergizing relay V which opens contact 315. Thus ground is removed from conductor 316, and clutch magnet circuit 247 and clutch members 206 and 207, as well as clutch members 241 and 242 release. In deenergizing, relay Z closed contact Z2 but the latter is ineffective on this round of operation as conductor 261 is open at W1.

Clutch complements 206 and 207 having released, shaft 72 stops and is returned to its normal position by action of spring 243 and in this position, contacts 101 and 230 close and 221 and 308 open. The apparatus is now ready for another operation. The action of spring 243 always restores shaft 72 to normal at the conclusion of a complete period of operations which may include both a bid and ask cycle, as is usually the case, or either, and irrespective of the number of digits in either a bid or ask price which may include a fraction.

If the caller continues with the receiver off the hook, relay FA (Fig. 3) remains energized, grounding contact FA1, which starts another period of operations. Upon placing receiver on hook, relays FA and FB deenergize, grounding contact FA2 and FB2 and as off normal contact F3 is closed, release coil 93 is energized, releasing selected digit switch AN.

In the event that other parties call for the same stock at the time a quotation is being transmitted, cut off relay as FE temporarily associated with such calling line is held energized until start cam 100 returns to its zero position, at which time the other parties' lines will be cut in on the transmission circuit and in this case all parties may continue to hold this line on the same selected stock.

The system herein disclosed is applicable generally for translating settings on an indicator into an audible record which is transmitted to a point remote from said settings where it is audibly received. But particularly, the invention is of considerable value in cases where access to stock quotations at a price source may be directly had from a brokerage office, or any office remote from the source of price. The invention may be used in railroad stations. By simply dialing a designation identifying a train, the time of its departure and arrival of said train may be audibly received. To this end the indicating dials would be set to indicate time, and the bands would contain records of the name of the train, the time of its departure from a distant point, and its time of arrival at its destination. In like manner, the indicating dials may be employed for setting any information for transmission to a distant point, and the sound bands be provided with a record to translate the settings of information into an audible record for reception at the distant point.

While reference in the claims is made to "stock", "price", "bid", "ask", "quotation", it is recognized that the invention need not be limited to a stock price announcing system. Strict interpretation of these terms is therefore not contemplated.

The above disclosure has been given by way of preference only for readily understanding the method and means employed in carrying out the principles of the invention, and while certain particular embodiments have been set forth and illustrated, it is to be understood that other modifications may be made within the scope of the appended claims, the terms of the latter being employed for the sake of clearness rather than by way of limitation.

What is claimed is:

1. In an announcing system, in combination, a plurality of commodity groups of price indicators settable to indicate prevailing prices of the respective commodities, electrically controlled means for selecting an indicator group, sound bands, means responsive to the selection of an indicator group for setting a predetermined order of said sound bands in operation to announce a quoted price indicated by the setting of the indicators of the selected group, and means for preventing intermingling of prices if a price change is made during progress of transmission of said quotation.

2. In an announcing system, in combination, groups of price indicators, switching means, impulse transmitting means for controlling the operation of said switching means to select one of said price indicator groups, sound bands, driving means therefor and means responsive to the selection of a price indicator group for actuating said driving means in varying periods of operation and successively operate a predetermined order of sound bands, and means controlled by the driving means and operative subsequent to the operation of said selected order of sound bands irrespective of the steps in a cycle in one of said periods for disabling said driving means.

3. In an announcing system, in combination, groups of settable price indicators, switching means, electrically controlled means for operating said switching means and select one of said groups, sound bands and driving means therefor, means responsive to the selection of the price indicator group for actuating said driving means in varying periods of operation and successively operate a predetermined order of sound bands in accordance with the set position of the indicators of the selected group, and means for restoring said driving means to normal at each period of operations.

4. In combination, settable indicators, a sound band and a relay individual to each settable position of the indicators and common to all of said indicators, means for selecting one of said indicators and rendering effective the corresponding relay, time controlled means, means controlled by said time controlled means to guard the operation of said corresponding relay if already in operated position, and means responsive when said corresponding relay has been made effective to actuate in succession corresponding sound bands to transmit audible indications determined by the set position of the selected indicator.

5. In combination, groups of settable indicators, voice reproducing means comprising bid, ask and price sound bands, control relays individual to each of said bands, means for selecting one of the indicator groups means controlled by the selection of one of the indicator groups for rendering effective a predetermined order of control relays determined by the setting of the indicators of the selected group to operate in succession a corresponding order of sound bands whereby the word "bid" followed by the bid price and the word "ask" followed by the ask price of a selected indicator group are audibly transmitted.

6. In combination, bid and ask settable indicators, voice reproducing means comprising bid and ask price sound bands, control relays individual to each band, driving means for the sound bands, means for controlling the setting of the indicators, and means for rendering and holding operative said driving means to cause the sound bands to announce for one or more periods of operations a bid price determined by the operated bid control relays followed by an ask price announcement determined by the operated ask control relays, or alternatively each period comprising either a bid price announcement or an ask price announcement where there is no ask setting or bid setting respectively of the indicators.

7. In combination, bid and ask settable indicators, voice reproducing means comprising bid, ask, and price sound bands, control relays common individual to each band, driving means for the sound bands, time controlled means actuated by said driving means, guard means for holding operative said driving means for one or more periods of operations, means responsive to the operation of said bid relays to cause the corresponding sound band or bands to announce a bid price corresponding to the position of one or more of said bid settable indicators, and means for holding ineffective said ask band during transmission of the bid price and holding ineffective the said bid sound band during transmission of said ask price to announce the position of one or more of said ask indicators.

8. In combination, groups of settable bid and ask price means, switching means associated therewith, electrically controlled means for selecting one of said groups, sound bands for bid, ask and price announcements, a pair of control relays for each band, driving means, means for extending a circuit to one relay of the pair associated with said bid band to energize said one relay and its mate relay, timing means, means responsive to the energization of said one relay for energizing a selected price band relay, guarding means rendered effective through the energization of said price band relay comprising means for operating said driving means and set said timing means off starting position releasing said one relay and holding guarded said mate bid relay, and operative means associated with said mate bid relay for setting said bid price sound band in motion, and means for transmitting the record of said bid band to be heard, and means for disabling the operation of said bid band after its audible reproduction and holding previously energized price band control relays energized.

9. In combination, groups of settable bid and ask price means, switching means associated therewith, electrically controlled means for selecting one of said groups, one of said groups comprising bid and ask dials, a unit of sound bands for bid, ask and price announcements, a pair of control relays for each band, driving means, means for extending a circuit to one relay of the pair associated with said bid band to energize said one relay and its mate relay, timing means, means responsive to the energization of said one relay for energizing momentarily a selected price band pair of relays, guard means rendered effective through the energization of said selected pair of price band relays comprising means for operating said driving means and set said timing means off starting position releasing said one relay and holding effective said mate bid relay, operative means associated with said mate bid relay for setting said bid price sound band in motion, means for transmitting the record of said bid band to be audibly received, means for disabling the operation of said bid band and holding previously energized selected price band pair of relays effective, said timing means being operable to control the operation of said selected pair or pairs of price band relays to actuate associated price sound bands in the announcement of the bid price, means for announcing the word ask and ask price corresponding to the value of the setting of the ask dials of the selected group subsequent to the audible reception of the bid price.

10. In combination, stock groups having bid and ask price indicators electrically controlled means for selecting one of said groups, sound bands for bid, ask and price announcements, a pair of control relays for each band, driving means, means for extending a start circuit to one relay of the pair of relays associated with said bid band to energize said one relay and its mate relay, means responsive to the energization of said one relay for energizing a selected price band relay, a clutch magnet associated with said driving means, means for holding said clutch magnet for one or more periods of operations and means for rendering effective a price sound band or bands in the announcement of the bid price corresponding to the position of the one or more bid indicators of said selected group.

11. In an announcing system, in combination, groups of settable price indicators, switching means associated herewith, impulse transmitting means for operating said switching means to select one of said groups, sound bands, driving means operatively associated with said sound bands, means rendered operative by the selection of said indicator group for actuating said driving means in varying operating periods, and successively operate a predetermined order of sound bands dependent upon the setting of the indicators of the selected group, and means controlled by said driving means and operative subsequent to the operation of said selected order of sound bands irrespective of the number of steps in a cycle in one of said periods for disabling said driving means.

12. In an announcing system, the combination of a plurality of calling lines, a plurality of settable indicating means, a plurality of sound bands, control relays for the sound bands, selecting means controlled over any of the calling lines to select any of said indicating means and for operating certain of the control relays corresponding to the setting of the selected indicating means, and means controlled by the operated control relays to cause the sound bands determined by the operated control relays to reproduce audibly the setting of said selected indicating means.

13. In an announcing system, the combination of quotation announcing means at a central office, a plurality of lines connecting local stations to the central station, means at the central office and controlled from any of the local stations to start the operation of and connect said quotation announcing means to the line exercising the control, and means to prevent the connection of said quotation announcing means to a second line until the quotation previously started has been fully completed.

14. In an announcing system, the combination of a set of dials for each of a plurality of stocks each set comprising separate dials for bid and ask prices of stock and correspondingly settable, and a group of announcers common to the sets of dials and including one for each settable position located at a central station; with impulse transmitting means at a local station connected by a line circuit to the central station, means at the central station responsive to operation of the transmitting means to select a dial set and to cause the announcers determined by the set positions of the bid and ask price dials of a selected dial set to announce the corresponding bid and ask prices.

15. In an announcing system, the combination comprising a plurality of price indicators each settable to different positions corresponding to the prevailing bid and ask quotations on a commodity, a sound record band for each settable position of any price indicator, means for selecting any one of said price indicators, means operatively responsive to said selection for actuating in a predetermined order the sound record bands corresponding to the set positions of the selected price indicator, and means for audibly reproducing the actuated sound record bands in the order of their actuation.

16. In an announcing system, the combination comprising a plurality of price indicators each settable to different positions corresponding to the prevailing bid and ask quotations on a commodity, a sound record band for each settable position of any price indicator, means for selecting any one of said price indicators, and means responsive to said selection for audibly reproducing in a predetermined order the sound record bands corresponding to the set positions of the selected price indicator.

17. In an announcing system, the combination comprising a plurality of stock or commodity groups of price indicators, each group having a first indicator adapted to be set for prevailing bid quotations and a second indicator adapted to be set for prevailing ask quotations, a set of sound bands, remotely controlled means for selecting any price indicator group, means responsive to the selection of a price indicator group for actuating in a predetermined order first the sound bands corresponding to the set position of the first price indicator of the selected group and then the sound bands corresponding to the set position of the second indicator of the selected group, and means for reproducing the actuated sound bands in the order of their actuation.

18. In an announcing system, the combination comprising groups of price indicators, remotely controlled switching means for selecting one of said price indicator groups, sound bands and common driving means therefor, means responsive to the selection of a price indicator group for starting said common driving means and for subsequently clutching predetermined sound bands one at a time to said common driving means to announce a price determined by the selected price indicator group, and cam means controlled by said common driving means for unclutching each of the clutched sound bands after the announcement thereof, said cam means being also effective after the price has been announced to disable said common driving means.

19. In an announcing system, the combination comprising groups of settable price indicators, remotely controlled switching means for selecting any one of said indicator groups, sound bands and driving means therefor, means responsive to the selection of a price indicator group for actuating said driving means in varying periods of operation and for successively operating a predetermined order of said sound bands determined by the set positions of the selected price indicator group, one of said periods comprising a bid and ask cycle, each cycle containing at least two operating steps, and means for restraining either a bid or ask cycle for any one of said periods of operation.

20. In an announcing system, the combination of a plurality of indicating units each having a plurality of indicators settable to various positions to indicate a price, groups of sound reproducers each comprising a plurality of sound bands characteristic of each settable position of the indicators in an indicating unit, means for selecting any unit and a group of sound reproducers, and means controlled by the operation of said last-mentioned means for actuating, in a predetermined order, the sound bands of the selected reproducer group corresponding to the set positions of the indicators in the selected indicating unit to announce the price indicated by said unit.

21. In an announcing system, the combination of a plurality of indicating units each having a plurality of indicators settable to various positions to indicate a price, groups of sound reproducers each divided into sub-groups, each sub-group having sound bands characteristic of each settable position of one of the indicators in an indicating unit, means for selecting any indicating unit and a group of sound reproducers, and means controlled by the operation of said last-mentioned means for actuating, in a predetermined order, the sound bands of the sub-groups in the selected reproducer group corresponding to the set positions of the indicators in the selected indicating unit to announce the price indicated by said unit.

22. In an announcing system, a central station having a plurality of indicating units each having a plurality of indicators settable to various positions to indicate a price, groups of sound reproducers each comprising a plurality of sound bands characteristic of each settable position of the indicators in an indicating unit, a line circuit extending from the central to a local station, an impulse transmitter at the local station, and means at the central station responsive to impulses received over said line and from said transmitter to select an indicating unit and a group of reproducers and to cause the sound bands of the selected reproducer group corresponding to the set positions of the indicators in the selected indicating unit to announce the price indicated by said unit.

In witness whereof, I hereunto subscribe my name this 17th day of Feb. 1930.

CLYDE SMITH.